United States Patent [19]

Townsend

[11] Patent Number: 4,956,893
[45] Date of Patent: Sep. 18, 1990

[54] APPARATUS FOR ENCASING A PRODUCT
[75] Inventor: Ray T. Townsend, Des Moines, Iowa
[73] Assignee: Townsend Engineering Company, Des Moines, Iowa
[21] Appl. No.: 464,303
[22] Filed: Jan. 12, 1990

Related U.S. Application Data

[63] Continuation of Ser. No. 319,261, Mar. 6, 1989, Pat. No. 4,905,349.

[51] Int. Cl.⁵ .................. A22C 11/10; A22C 11/00
[52] U.S. Cl. ................................. 17/34; 17/1 F; 17/49; 53/550
[58] Field of Search ............... 17/35, 36, 37, 38, 41, 17/49, 34, 1 F, 42; 53/550

[56] References Cited

U.S. PATENT DOCUMENTS

| | | | |
|---|---|---|---|
| 2,331,969 | 10/1943 | Friedricks et al. | 17/34 |
| 2,406,163 | 8/1946 | Prohaska | 17/34 |
| 3,766,603 | 10/1973 | Urbutis et al. | 17/42 |
| 4,525,984 | 7/1985 | Kollross | 17/42 |
| 4,730,367 | 3/1988 | Vinoker | 53/550 |

FOREIGN PATENT DOCUMENTS

| | | | |
|---|---|---|---|
| 3011141 | 3/1988 | Japan | 17/34 |
| 935141 | 8/1963 | United Kingdom | 17/1 F |

Primary Examiner—Willis Little
Attorney, Agent, or Firm—Zarley McKee, Thomte, Voorhees & Sease

[57] ABSTRACT

An apparatus for forming an encased meat product which includes means for forming an enclosed casing from a series of overlapped helical revolutions of a strip of casing material, means for filling the casing with a meat emulsion, means for rotating the filled casing, and means for holding the filled casing against rotation while the unfilled casing is rotated to create a twist point at the end of the filled casing, whereby the twist point will have the same number of twists therein as there are helical revolutions of strip material in said enclosed casing.

1 Claim, 5 Drawing Sheets

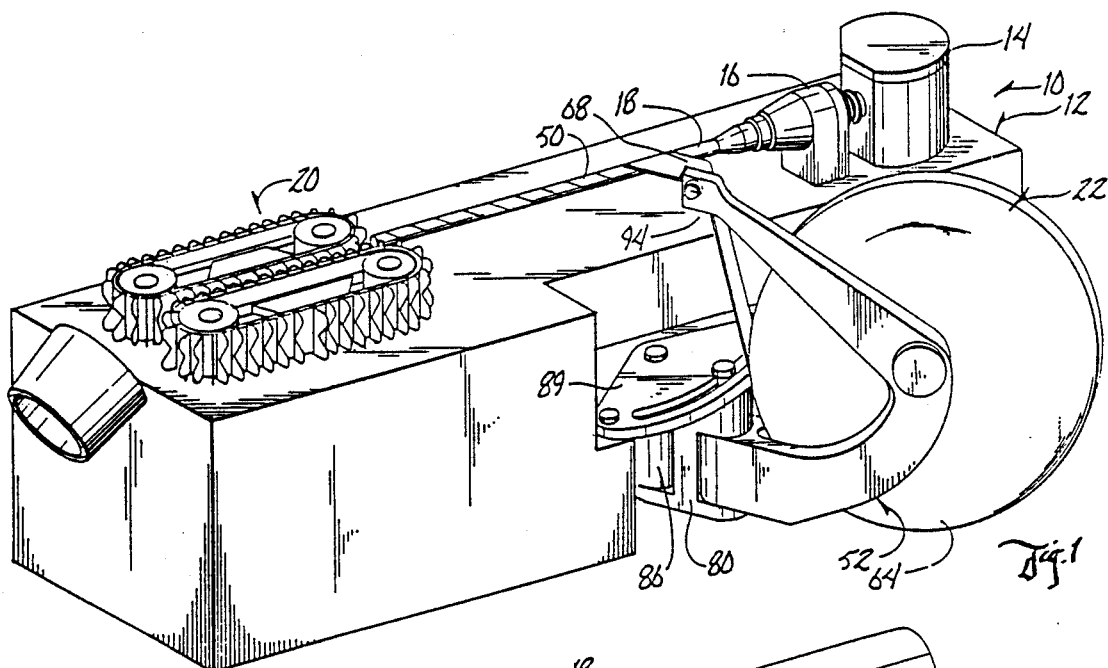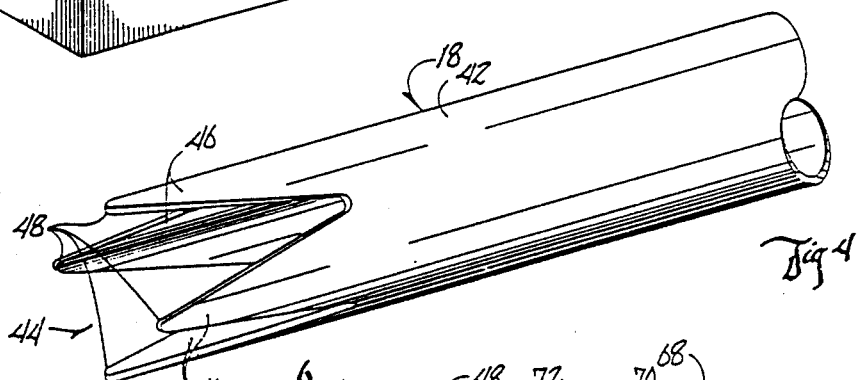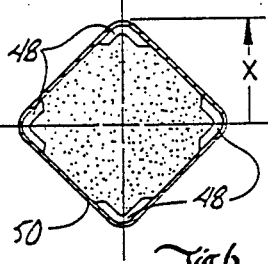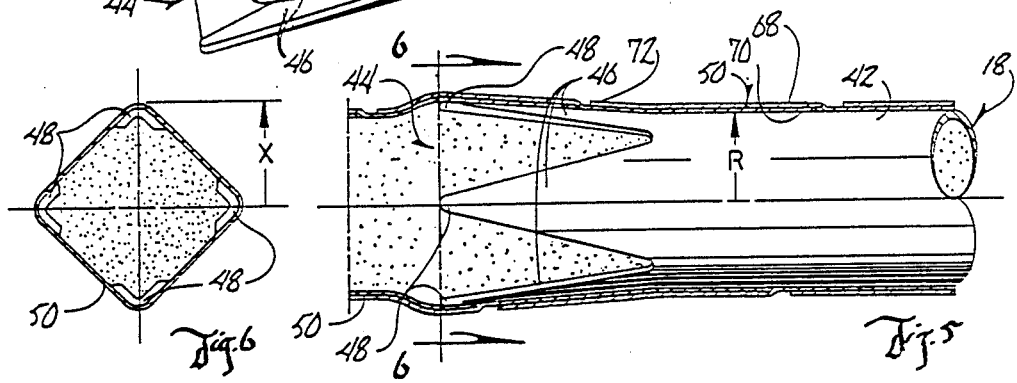

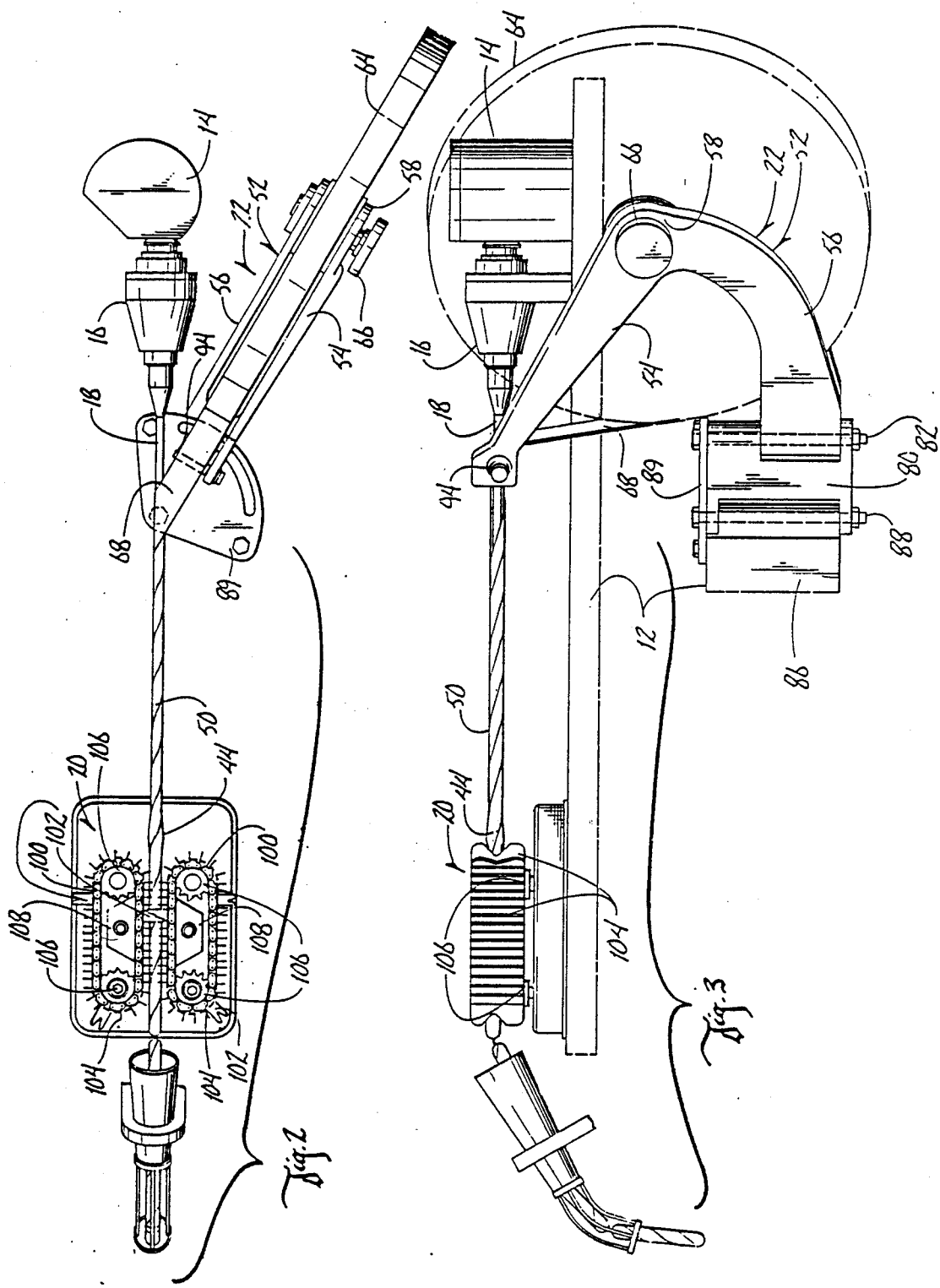

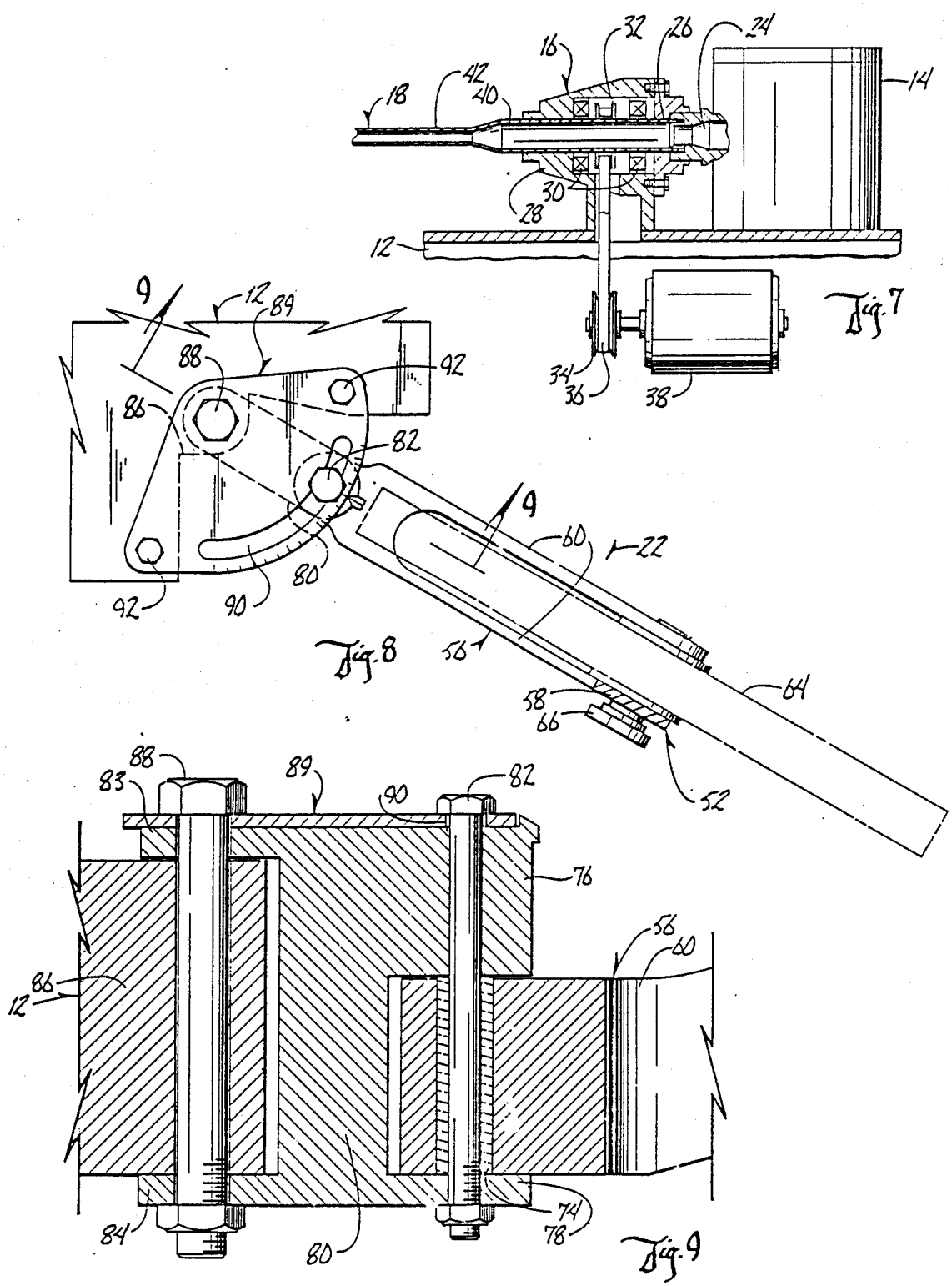

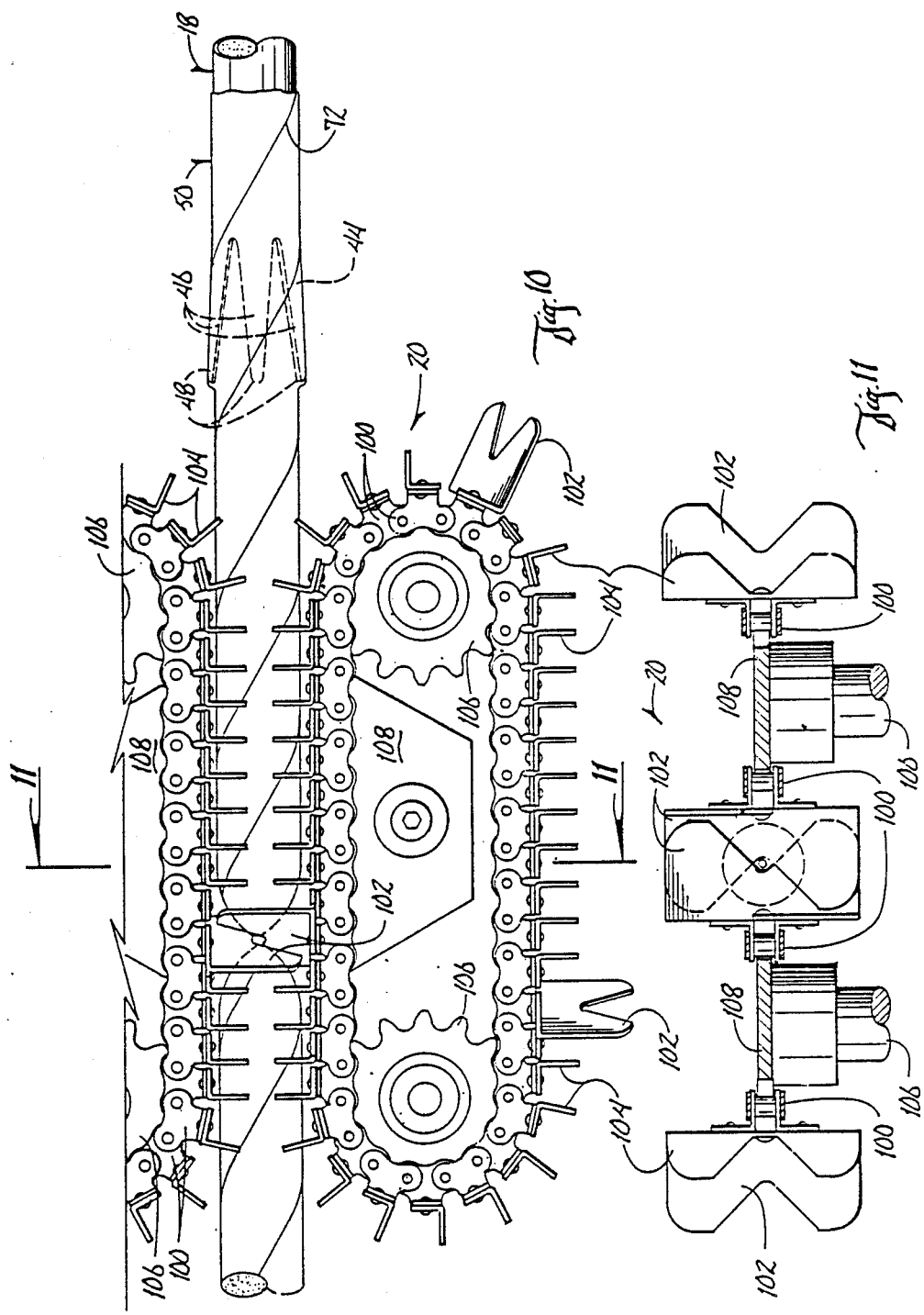

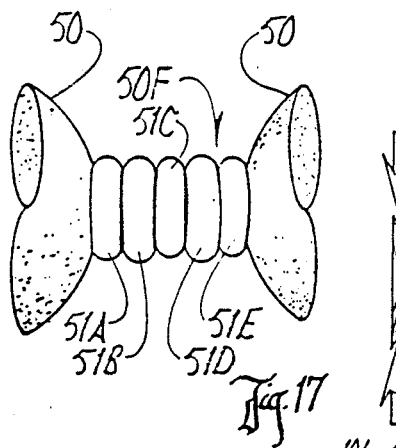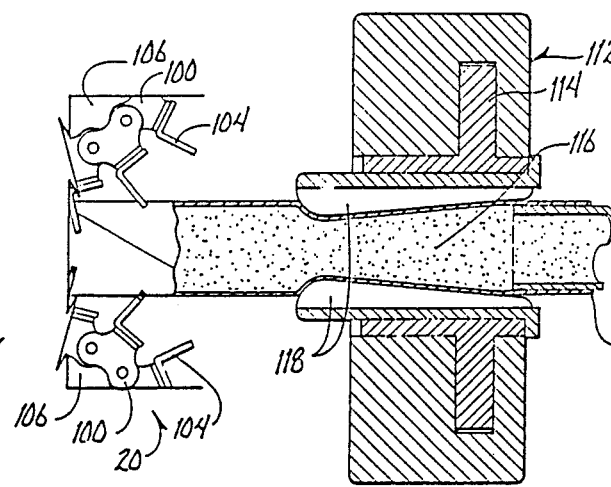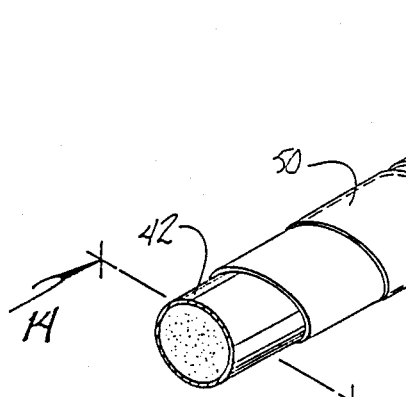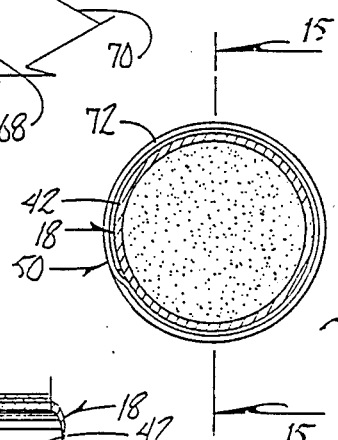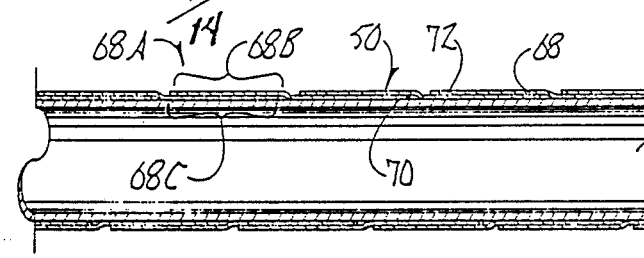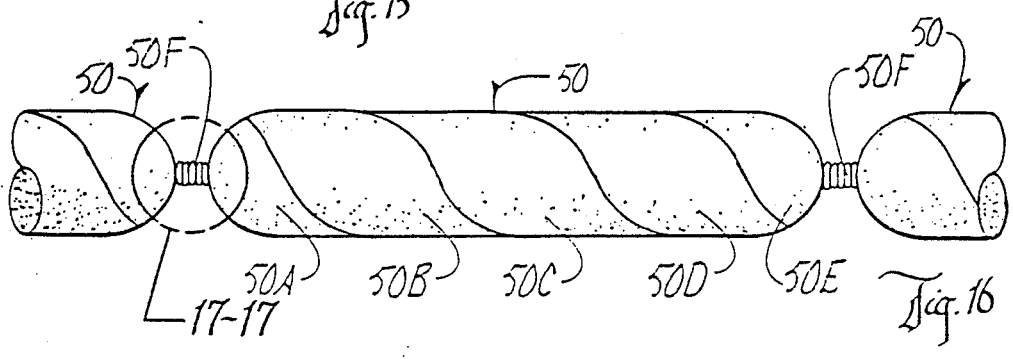

APPARATUS FOR ENCASING A PRODUCT

This application is a continuation of application Ser. No. 319,261, filed Mar. 6, 1989, now U.S. Pat. No. 4,905,349.

BACKGROUND OF THE INVENTION

Making an encased meat product or the like with the use of a helical casing is disclosed in such prior U.S. Pat. Nos. 2,575,467; 4,709,447; 4,660,255; and 4,727,625. However, it has been since discovered that the process of making such a product from a helically-wound casing is greatly facilitated by making the number of twists in the casing at the end of the encased frank or sausage equal in number to the number of helical convolutions that form the body of the casing. This is, therefore, the object of the present invention, which all of the prior art fails to disclose or appreciate.

SUMMARY OF THE INVENTION

An apparatus for forming an encased meat product which includes means for forming an enclosed casing from a series of overlapped helical revolutions of a strip of casing material, means for filling the casing with a meat emulsion, means for rotating the filled casing, and means for holding the filled casing against rotation while the unfilled casing is rotated to create a twist point at the end of the filled casing, whereby the twist point will have the same number of twists therein as there are helical revolutions of strip material in said enclosed casing.

BRIEF DESCRIPTION OF THE DRAWINGS

FIG. 1 is a perspective view of the apparatus of the present invention.

FIG. 2 is a top plan view of the present invention.

FIG. 3 is a front elevational view of the present invention.

FIG. 4 is an enlarged perspective detail of the end of the stuffing tube.

FIG. 5 is a detailed sectional view showing the arrangement of the casing on the end of the stuffing tube.

FIG. 6 is a sectional view taken along line 6—6 of FIG. 5.

FIG. 7 is an enlarged sectional detail showing the inlet end of the stuffing tube.

FIG. 8 is a top plan view of the casing feed apparatus.

FIG. 9 is a sectional view taken along line 9—9 of FIG. 8.

FIG. 10 is an enlarged detail plan view of the discharge end of the stuffing tube and the linking means.

FIG. 11 is a sectional view taken along line 12—12 of FIG. 11.

FIG. 12 is a view similar to FIG. 10, but showing a modified form of the invention.

FIG. 13 is a partial perspective view of a portion of the stuffing tube as the ribbon material is being wound thereon.

FIG. 14 is a transverse sectional view taken on line 14—14 of FIG. 13.

FIG. 15 is a longitudinal sectional view taken on line 15—15 of FIG. 13.

FIG. 16 is a side elevational view of a string of linked products made according to the invention.

FIG. 17 is an enlarged pointed elevational view taken on line 17—17 of FIG. 16.

DESCRIPTION OF THE PREFERRED EMBODIMENT

Referring to FIG. 1, the numeral 10 generally designates the stuffing and linking machine of the present invention. Machine 10 comprises a table or housing 12 having mounted on its upper surface a product pump assembly 14, a tube support assembly 16, a stuffing tube or horn 18, and a linking apparatus 20. Also mounted to table 12 is a casing ribbon feed assembly 22.

Referring to FIG. 7, product pump 14 is of conventional construction and therefore the details are not shown. Pump 14 includes an outlet 24 which is in communication with the inlet end 26 of stuffing tube 18. Tube support assembly 16 includes a housing 28 which is mounted on the upper surface of table or housing 12 and which includes a plurality of bearings 30 which support stuffing tube 18 and which provide rotatable mounting of stuffing tube 18 for rotation about a horizontal axis. A belt pulley 32 is mounted on stuffing tube 18 within housing 28. Trained around belt pulley 32 and around an additional motor pulley 34, is a drive belt 36. Motor pulley 34 is driven by a motor 38 so as to cause rotation of stuffing tube 18 about its longitudinal axis.

Stuffing tube 18 includes an enlarged diameter portion 40 adjacent its inlet end 26, and also includes an elongated reduced diameter portion 42 extending from enlarged portion 40 to the discharge end 44 of stuffing tube 18 (FIG. 4).

As can be seen in FIGS. 4 and 5, the discharge end 44 is provided with a plurality of fingers 46, each of which is flared radially outwardly to a finger tip 48. In the configuration shown in FIGS. 4 and 5, there are four fingers 46, but more or less fingers can be utilized without detracting from the invention.

As can be seen in FIG. 6, each of the finger tips 48 engage the interior surface of the casing 50 so as to cause the casing to have a substantially polygonal shape (in the case of the configuration shown in FIGS. 4 and 5, a square shape), rather than the circular cross-sectional shape which occurs around the reduced diameter portion 42 of stuffing tube 18. The outward flaring of tips 48 is chosen so that the tips do not deform or stretch the casing from its original natural shape attained by virtue of surrounding the stuffing tube 42. That is, the circumference of the casing 50 when it is engaged by finger tips 48, is the same and is not enlarged from the circumference of the casing 50 when it is surrounding the reduced diameter portion 42 of stuffing tube 18. Referring to FIG. 6, the dimension X represents the distance from the cross-sectional center of the stuffing tube to the outwardly tapered tips 48. If this distance X is chosen to be approximately 1.11 times the radius of the stuffing tube at reduced diameter portion 42, the result will be a deformation of the circular shape of the casing by fingers 48 without stretching or enlarging the circumference of the casing.

The result of the above configuraiton of outwardly flared fingers 46 is that a longitudinal drag is imparted to the casing so as to counteract the forward propelling motion imparted by the product exiting from the outward discharge end 44 of stuffing tube 18.

Casing ribbon feed assembly 22 is comprised of an elongated elbow frame 52 having an upper frame member 54 and a lower frame member 56 which are joined at an elbow 58. Upper frame member 54 is singular in construction. Lower frame member 56 is comprised of a pair of spaced apart arms 62. Spaced apart arms 62 and upper frame member 54 are joined to one another at elbow 58.

Rotatably mounted between spaced apart arms 62 is a casing reel 64 which is supported at elbow 58 by means of an axle pin 66 which extends through the center of reel 64. Pin provides rotational mounting of reel 64 about a horizontal axis.

Wrapped around reel 64 is an elongated casing ribbon 68 which is flat and which includes opposite lateral edges 70, 72 (FIG. 13). Ribbon 68 is a cellulose material commonly used in sausage encasement. The thickness thereof is approximately 0.0012 inches and the width can vary, but a width of one to four inches is satisfactory.

The lower end of lower frame member 56 includes a vertically oriented bushing 74 (FIG. 9) which is positioned between two vertically spaced jaw members 76, 78 of a swing block 80. A pivot pin or bolt 82 extends downwardly through upper and lower jaws 78 and also through bushing 74 so as to provide pivotal mounting of elbow frame 52 about a vertical axis. As can be seen in FIG. 9, the length of bushing 74 is slightly greater than the thickness of lower frame member 56 so that frame member 56 will pivot freely about bushing 74 without binding against the upper and lower spaced apart jaws 76, 78.

Swing block 80 includes also a pair of spaced apart flanges 83, 84 which embrace a support block 86 rigidly mounted to table or housing 12. Swing block 80 is pivotally mounted to support block 86 by means of a bolt or pin 88 which extends through flanges 83, 84 and also extends through support block 86. Thus, swing block 80 is free to swing about the vertical axis provided by pin 88.

Rigidly mounted to the upper surface of support block 86 is an adjustment plate 89. Plate 89 is held against movement with respect to block 86 by means of bolts 92 and also by means of pin 88 which extends through plate 89.

Plate 89 includes an arcuate slot 90 therein which extends along a curve which is concentric to the pivotal axis provided by pin 88. Bolt 82 extends through slot 90 and thence downwardly through jaw members 76, 78 and bushing 84. When bolt 82 is tightened, it holds swing block 80 against pivotal movement about axis 88, while at the same time permitting elbow frame 52 to pivot freely or swivel freely about the vertical axis provided by pin 82. When it is desired to swing block 80 about axis 88, all that is necessary is to loosen blot 82 and pivot the swing block 80 about pin 88 to the desired position. Bolt 82 is then tightened and the swing block 80 is held against further swinging movement.

Mounted on the upper end of upper frame member 54 is a ribbon support pin 94 (FIGS. 2 and 3). Pin 94 provides a sliding support surface for the ribbon 68 as it is pulled off of reel 64.

The free end of the ribbon as it passes off of reel 64 passes upwardly over pin 94 and then is wrapped around the stuffing tube 18 in a helical fashion so as to form an elongated cylindrical casing designated by the numeral 50. With reference to FIG. 15. each helix 68A comprises overlapped portions 68B and 68C. The amount of overlapping can vary, but it needs to be sufficiently great that the helixes 68A will not separate upon being filled with material. Overlapping equal to one-half the width of ribbon 68 is more than sufficient.

As can be seen in FIGS. 2 and 3, pin 94 is positioned forwardly of swivel pin 82. This arrangement places reel 64 and pin 94 on opposite sides of the swivel axis provided by pin 82. When ribbon 68 is pulled over pin 94 it causes the entire frame 52 to swivel freely about swivel pin 82 so as to self align the reel 64 with the angle of the ribbon helixes being formed on the stuffing tube.

The linking mechanism 20 is of conventional construction and includes a pair of rotating linking chains 100 having a plurality of V-shaped pinching members 102 and a plurality of V-shaped holding members 104 thereon. Chains 100 are mounted on spaced apart sprockets 106 and a pair of holding brackets 108 are positioned to hold the chains in spaced apart relationship so as to provide a link path 110 therebetween for receiving the rotating casing 50 from the discharge end of the stuffing tube 18 and for forming twisted links from the filled casing in conventional fashion.

The modification shown in FIGS. 1-12 includes a rotating stuffing tube 18. However, the present invention may also be utilized in combination with a stationary stuffing tube. FIG. 12 illustrates a modified form of the invention, wherein a stationary stuffing tube 110 includes adjacent its discharge end a rotating chuck assembly 112. Chuck assembly 112 is similar to rotating chucks presently used in product encasing machines. It includes a rotatable driven member 114 having a longitudinal chuck opening 116 with a plurality of flutes 118 protruding raidally inwardly therefrom. Flutes 118 are adapted to engage the outer surface of the casing after it has been filled by product issuing from the discharge end of stuffing tube 110. The rotatable member imparts a rotation to the filled casing so that the casing is rotating at the time it is engaged by the linking mechanism 20.

The operation of the device shown in FIGS. 1-11 is as follows: The operator first determines the angle at which he wants the strip 68 to engage the stuffing tube 18. This is accomplished by loosening bolt 82 and pivoting swing block 80 within arcuate slot 92 to the desired angle. Bolt 82 is then tightened so as to prevent further movement of swing block 80. The free swiveling mounting of elbow frame 52 about pin 82 permits the reel 64 to swivel freely about the vertical axis of pin 82. This permits the reel 64 to self align by the action of the ribbon being pulled off the reel.

After choosing the correct setting for swing block 80, the operator pulls the loose end of ribbon 68 upwardly over pin 94 as shown in FIGS. 3 and 4. He then wraps the casing around the stuffing tube 50 in helical fashion as shown in FIG. 2 until a portion of the casing is protruding beyond the discharge end of the stuffing tube. As the operator pulls the ribbon off of reel 64, the overlapping portions 68B and 68C tend to frictionally adhere to each other to maintain the construction of the casing 50. Thus, when the ribbon is wrapped around stuffing tube 18, the lateral edges 70, 72 overlap and engage and frictionally adhere to one another and cause the ribbon to be formed into an elongated cylindrical casing designated by the numeral 50 in the drawings.

The operator next turns the machine on, causing the product pump 14 to force product through the stuffing tube and simultaneously causing the stuffing tube 18 to rotate. As the stuffing tube rotates, the friction between the stuffing tube and the cylindrical casing 50 causes the cylindrical casing 50 to rotate in unison with the stuffing tube. The product being pumped through the stuffing tube exits through the discharge end of the stuffing tube and fills the casing which is protruding beyond the stuffing tube so as to form a filled link which is engaged by the linking mechanism in conventional fashion as shown in FIGS. 10 and 11. The filling of the casing exerts an outward force against the helixes 68A and causes the overlapping portions 68B and 68C to more firmly engage and to frictionally adhere together.

The flared finger tips 48 engage the interior surface of the casing as it is being pulled off the discharge end of the stuffing tube, and provide a retardation or drag on the axial movement of the casing. This permits the casing to be at least partially filled prior to the linking operation. The lateral speed of the linking apparatus provides a final degree of filling as desired. The flared finger tips 48 also facilitate the rotation of the casing 50 in response to rotation of the stuffing tube.

The rotation of the stuffing tube and the axial movement of the cylindrical casing 50 from the discharge end of the stuffing tube causes the ribbon 68 to be continuously drawn off of reel 64 and wrapped helically around stuffing tube 18.

Because elbow frame 52 is permitted to swivel freely about the vertical axis of bolt 82, the reel 64 is permitted to align itself in a straight line with respect to the line between pins 82, 88.

If it is desired to change the location at which the ribbon is introduced to the rotating stuffing tube 18, the operator merely loosens bolt 82 and swings swing block 80 to the desired position. This will change the location of the reel relative to the stuffing tube so that the point at which the ribbon begins wrapping around the tube is also changed.

The angle of attack of ribbon 68 and the width of ribbon 68 are chosen so that the edges of the ribbon are adjacent or overlapping when wrapped around stuffing tube 18.

The result of the above construction is that the roll of casing is mounted on casing ribbon feed assembly 22 which is stationary with respect to the stuffing tube. At the same time, the present invention provides a rotating casing 50 at the end of the horn which is necessary in order to form the twisted links in combination with the linking mechanism 20.

The forward speed of the formed tubular casing 50 is controlled by the linking mechanism and by the speed at which the pump assembly 14 forces product from the end of the stuffing tube. The rotating speed of the tubular casing determines the lateral or transverse movement of the casing ribbon. Therefore, by manipulating these two speeds, and by using the correct width of ribbon, it is possible to achieve the desired angle of attack of the ribbon and to produce a tubular casing of desired diameter that is rotating at the proper speed to provide the desired number of twists per link and the desired length of each link.

In the modification shown in FIG. 12, the stuffing tube 110 is stationary and does not have a flared end. However, the rotation of the casing is provided by the rotating chuck assembly 112, which engages the filled casing adjacent the discharge end of the stuffing tube. This causes the casing to rotate on the stuffing tube, thereby producing the same effect of pulling the ribbon 68 off of feed assembly 22 and forming the helical convolutions which make up the cylindrical casing 50.

The linking mechanism 20 (FIGS. 10 and 11) functions to stop the rotation of the filled casing as it departs the exit end of the stuffing tube, to create the linked product 50 (FIG. 16) comprised of helical revolutions of strip material 50A, 50B, 50C, 50D, and 50E with twist points 50F at opposite ends thereof.

The number of twists 51A, 51B, 51C, 51D and 51E of casing in each of the twist points 50F will always equal the number of helical revolutions of strip material in the casing of linked product 50 because it is the number of revolutions of the casing material needed to create one linked product that causes the twist points 50F to be created. If the length of the casing involved six helical revolutions of strip material, the twist points would involve six twists therein. This coordination between the number of twists at the twist points equaling the number of helical revolutions in the linked product was not appreciable by the prior art, and serves to simplify the linking of such a helical casing. To do otherwise would substantially complicate the machines required to link the encased product.

I claim:

1. An apparatus for encasing a plastic product, comprising:
   a support;
   an elongated casing strip having opposide side edges;
   first means on said support for forming said strip into a plurality of helical revolutions with said side edges of said strip within each one of said helical revolutions frictionally engaging and overlapping said side edges of said strip within those of said helical revolutions adjacent said one helical revolution so as to form an elongated tubular casing;
   said overlapped edges of said casing strip being sufficiently overlapped to create enough friction cohesiveness to maintain said helical revolutions in a self-contained tubular casing to contain said plastic product;
   second means on said suport for introducing said plastic product into said casing; and
   a third means to sequentially twist said casing containing said plastic product at spaced intervals to form a linked product with twist points at opposite ends thereof, with the number of twists in said cylindrical casing at said twist points being equal to the number of helical revolutions of said strip in each of said linked products.

* * * * *